United States Patent [19]

Rhody

[11] B 4,013,029
[45] Mar. 22, 1977

[54] WATER VESSEL PROPELLED BY MOTORIZED LAND VEHICLE

[76] Inventor: Howard A. Rhody, 9312 S. Torrey, Grand Blanc, Mich. 48439

[22] Filed: May 23, 1974

[21] Appl. No.: 472,591

[44] Published under the second Trial Voluntary Protest Program on April 6, 1976 as document No. B 472,591.

Related U.S. Application Data

[62] Division of Ser. No. 174,057, Aug. 23, 1971, Pat. No. 3,826,216.

[52] U.S. Cl. ............................................. 114/255
[51] Int. Cl.² ......................................... B60F 3/00
[58] Field of Search .................. 115/.5 A; 9/1 T
[56] References Cited

UNITED STATES PATENTS

| | | | |
|---|---|---|---|
| 2,342,535 | 2/1944 | Frova | 115/.5 A |
| 2,662,236 | 12/1953 | Kester | 9/1 T |
| 3,076,425 | 2/1963 | Anderson | 115/.5 A |
| 3,332,388 | 7/1967 | Moraski | 115/.5 A |

FOREIGN PATENTS OR APPLICATIONS

| | | | |
|---|---|---|---|
| 1,185,518 | 3/1970 | United Kingdom | 115/.5 A |

*Primary Examiner*—Trygve M. Blix
*Assistant Examiner*—Gregory W. O'Connor
*Attorney, Agent, or Firm*—Basile, Weintraub and Vanophem

[57] ABSTRACT

A water vessel having a pair of spaced, parallel pontoons connected by a deck on which there is fixedly supported a land traversing vehicle such as a motorcycle or a snowmobile. The water vessel includes at least one propeller operatively coupled to the power output drive of the land traversing vehicle, such that the propeller is rotated when the land traversing vehicle is operated. The water vessel further comprises a steering coupling mechanism which operatively couples the steering mechanism of the land traversing vehicle to at least one rudder carried by the water vessel such that the rudder is responsive to control the direction of the water vessel in response to the movement of the steering mechanism of the land traversing vehicle. The water vessel also comprises a rotatably mounted shaft having L-shaped outer ends extending beyond the outer portion of each pontoon. The outer ends of the shaft rotatably mount support wheels adapted to swing between a lowered position, wherein the support wheels extend below the pontoons to enable the wheels to engage the ground and permit towing of the water vessel, and a raised position wherein the support wheels may be raised above the water level so as not to impede the operation of the water vessel when it is underway. Means are provided for selectively locking the support wheels in either the raised or lowered position.

1 Claim, 6 Drawing Figures

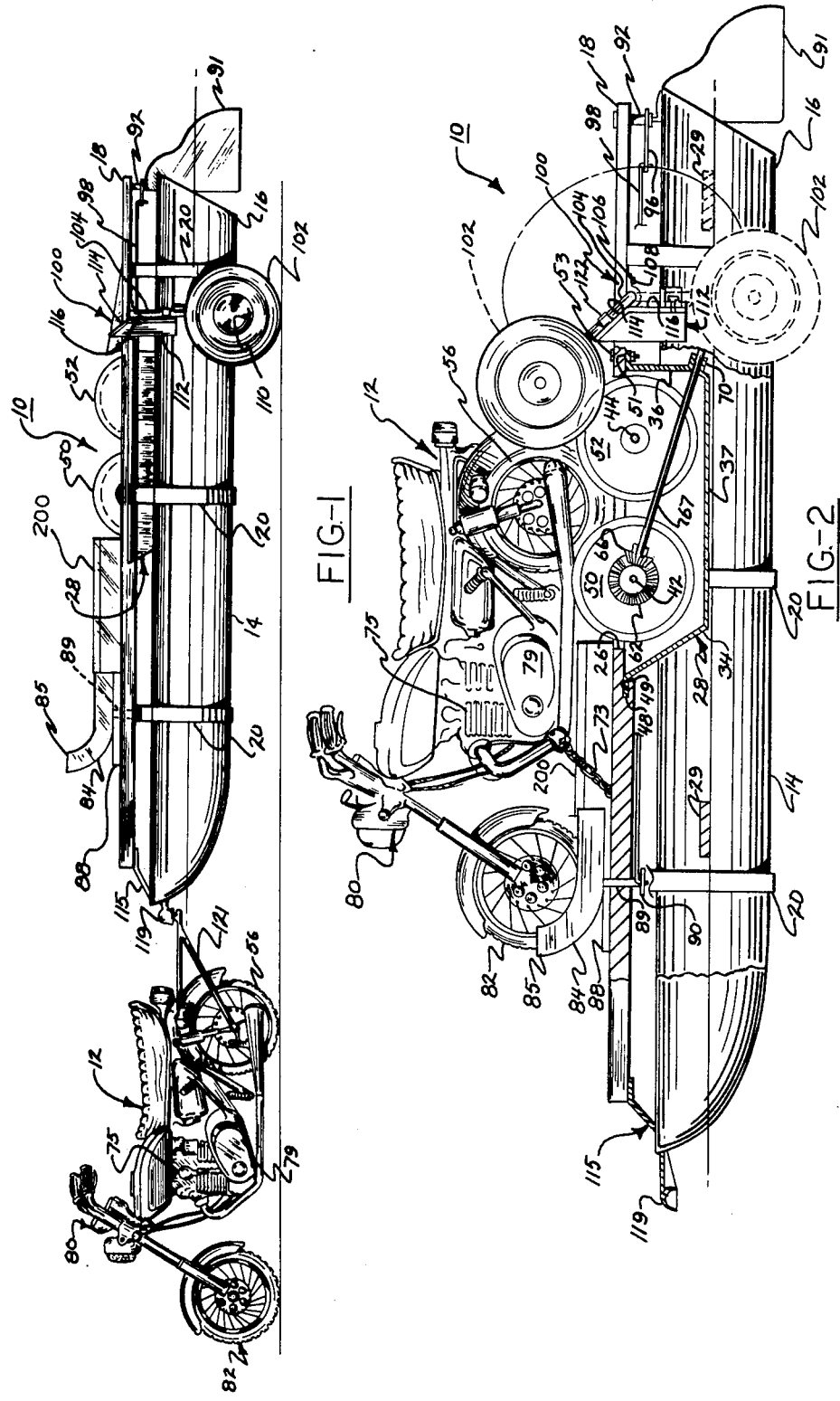

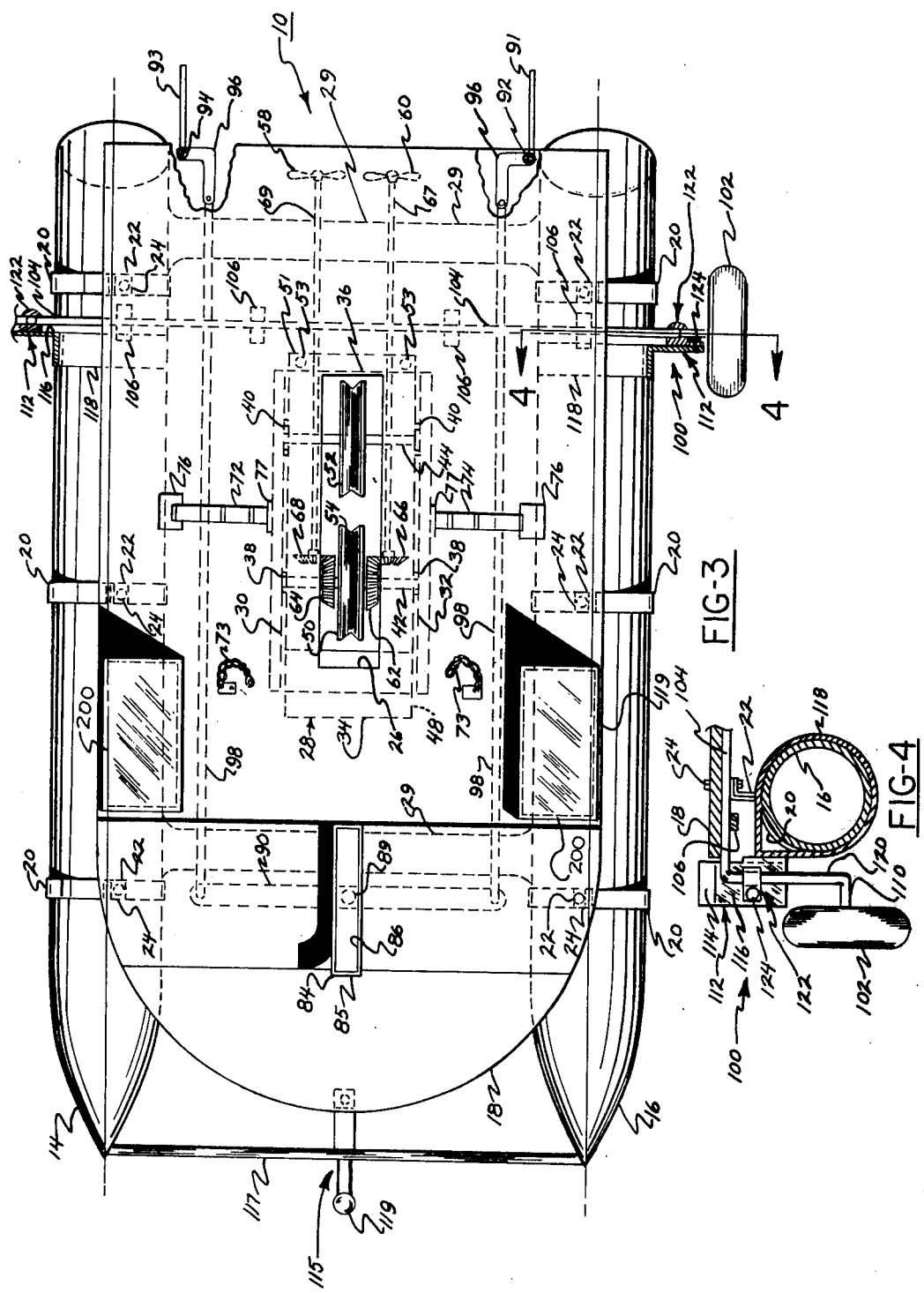

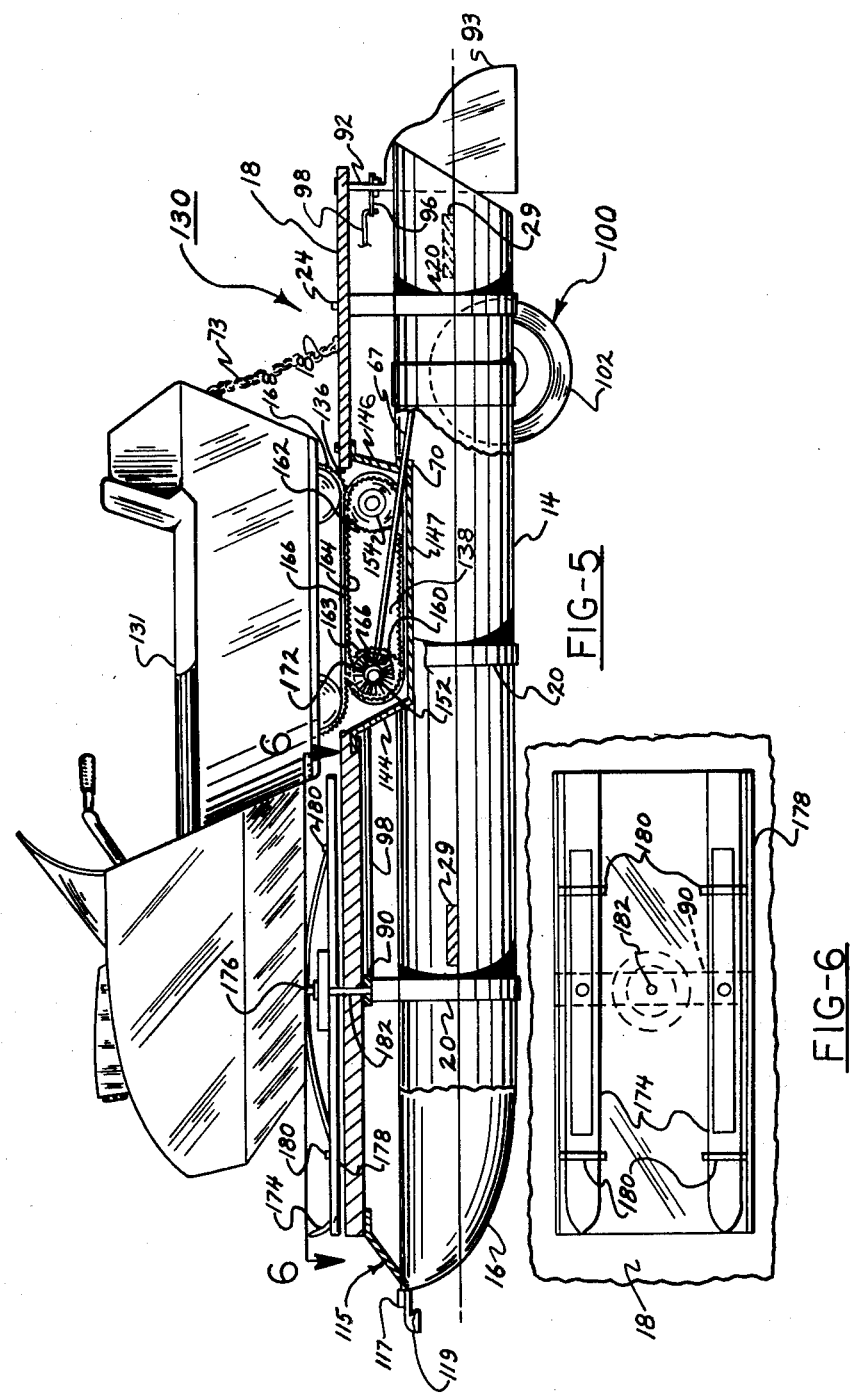

WATER VESSEL PROPELLED BY MOTORIZED LAND VEHICLE

This is a division of application Ser. No. 174,057 filed Aug. 23, 1971 now U.S. Pat. No. 3,826,216.

BACKGROUND OF THE INVENTION

I. Field of the Invention

The present invention relates to water vessels and, particularly, to water vessels of the pontoon type adapted to be powered by a land traversing vehicle such as a motorcycle or a snowmobile.

II. Description of the Prior Art

Pontoon boats and, particularly, pontoon boats which are adapted to be powered by a land traversing vehicle such as an automobile are known in the prior art. U.S. Pat. No. 1,804,262 issued May 5, 1931 to Walter C. Lewis et al is an example of such a water vessel. Although water vessels of this type are known, they have never become commercially successful products due to the fact that such water vessels are propelled by an automobile. Since automobiles are expensive, their deployment as a power source for such water vessels is both undesirable and impractical as the automobile driven water vessel may easily capsize. In addition, water vessels of the type disclosed in the aforementioned United States Patent do not provide any self-contained means permitting the removal of the water vessel from the water in such a manner that the water vessel may be towed by the vehicle which has been the propelling force when the water vessel was operated in the water.

SUMMARY OF THE INVENTION

The present invention, which will be described subsequently in greater detail, comprises a water vessel of the pontoon type having propulsion and steering means which are adapted to be connected to and operated by a land traversing vehicle. Means are provided for raising and lowering a pair of support wheels to convert the water vessel to a trailer adapted to be towed by the land traversing vehicle.

A particular advantage of the present invention is its adaptation for use with lightweight land vehicles such as snowmobiles and motorcycles which may be easily positioned on the water vessel by one or more individuals without the danger of the water vessel capsizing.

It is therefore an object of the present invention to provide a new and improved water vessel having means for using the power output and steering mechanism of a land traversing vehicle for propelling and steering the water vessel.

Another object of the present invention is to provide a water vessel of the pontoon type adapted to be powered by a land traversing vehicle and which is of a simple, lightweight, durable construction and which is easily controlled.

Other objects, advantages, and applications of the present invention will become apparent to those skilled in the art of water vessels when the accompanying description of some examples of the best modes contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and in which:

FIG. 1 is a side elevational view of a water vessel constructed in accordance with the principles of the present invention and with the water vessel being towed by a motorcycle;

FIG. 2 is a partially sectioned, side elevational view of the water vessel being powered by a motorcycle;

FIG. 3 is a partially sectioned, top elevational view of the water vessel illustrated in FIG. 1;

FIG. 4 is a fragmentary cross-sectional view of the water vessel as seen along line 4-4 of FIG. 3;

FIG. 5 is a partially sectioned, side elevational view of a modified water vessel adapted to be powered by a snowmobile; and FIG. 6 is a fragmentary cross-sectional view of the vessel as seen from line 6-6 of FIG. 5.

DESCRIPTION OF THE PREFERRED EMBODIMENTS

Referring now to the drawings, and in particular to FIGS. 1-4, there is illustrated one example of the present invention in the form of a water vessel 10 adapted to be towed on land by a land traversing vehicle such as a motorcycle 12. The water vessel 10 comprises a starboard pontoon 14 and a port pontoon 16 connected to one another by a deck 18 in such a manner that the pontoons 14 and 16 are maintained in a spaced, parallel relationship. The pontoons 14 and 16 and the deck 18 may be constructed of any suitable material adapted for use in water and are, preferably, constructed of a fiberglass material of sufficient strength to support both the occupant and the motorcycle 12, all of which will be described hereinafter in greater detail.

The deck 18 is fastened to the starboard and port pontoons 14 and 16 by a plurality of metal straps 20 circumscribing each pontoon 14 and 16 at longitudinally spaced locations along the length of each of the pontoons, and, as can best be seen in FIGS. 3 and 4, the ends of each metal strap 20 terminate in an L-shaped flange 22, the top leg portion of which abuts the bottom of the deck 18. Fastening members, such as nuts and bolts assembly 24, extend vertically through apertures (not shown) in the deck 18 and the L-shaped flanges 22 to securely attach the metal straps 20 and thus the pontoons 14 and 16 to the deck 18. A pair of transversely disposed and longitudinally spaced cross members 29 connect the opposing sides of the pontoons 14 and 16 and add to the strength of the vessel 10, as well as functioning to maintain the pontoons 14 and 16 in a parallel relationship.

As can best be seen in FIGS. 2 and 3, the central portion of the deck 18 has an elongated aperture 26 opening into a well 28. The well 28, which is disposed below the deck 18, is preferably of a fiberglass construction, having parallel sidewalls 30 and 32 connected by forward, aft, and bottom walls 34, 36 and 37, respectively. The opposing sidewalls 30 and 32 of the well 28 each support bearing members 38 and 40 within which are respectively rotatably mounted a driven shaft 42 and an idler shaft 44. The bearings are so arranged that the longitudinal axes of the shafts 42 and 44 are parallel to one another and transversly disposed with respect to the fore-aft axis of the water vessel 10. The well 28 is watertight and may be of an integral construction or the walls thereof may be secured to one another by any suitable means, such as an adhesive or the like. The well 28 has a forward peripheral flange 48 (FIG. 2) which is received in a slot 49 in the bottom surface of the deck 18, while an aft peripheral flange 52 (FIG. 2) is secured to the bottom surface of the deck 18 by any suitable fastening means, such as nut and bolt assemblies 53.

Driven shaft 42 and idler shaft 44 respectively support a driven roller 50 and an idler roller 52, each of which has a peripheral recess 54 (FIG. 3) adapted to receive and support the rear driven wheel 56 of the motorcycle 12. The idler roller 52 functions only to support the motorcycle wheel 56, while the driven roller 50 in addition to supporting the wheel 56 functions as a transmission coupling between the motorcycle wheel 56 and a pair of propellers 58 and 60 (shown only in FIG. 3) disposed at the stern of the water vessel 10. The driven shaft 42 has a pair of bevel gears 62 and 64 carried on the opposite sides of the driven roller 50, which mesh respectively with a second pair of bevel gears 66 and 68 respectively carried at the ends of drive shafts 67 and 69. The drive shafts 67 and 69 extend downwardly through sealed bearing member 70 (FIG. 2) in the aft wall 36 and are coupled to the propellers 58 and 60 respectively. The surface of the peripheral recess 54 of the driven roller 50 has a rough finish so as to prevent any slippage between it and the rotating motorcycle wheel 56.

When the rear wheel 56 of the motorcycle 12 is positioned within the recesses 54 of the driven and idler rollers 60 and 52, the motorcycle 12 is supported in an upright position by support members 72 and 74 (FIG. 3). Each of the support members 72 and 74 has its lower end pivotally mounted to the deck as shown at 76, while the upper opposite ends which are inclined upwardly towards the motorcycle 12 have a suitable clamping mechanism 77 adapted to engage the opposite sides of the motorcycle frame. The support members 72 and 74, in addition to supporting the motorcycle 12 in an upright position, function to restrain the motorcycle wheel 56 from disengaging the rollers 50 and 52. Safety chains 73 carried by the upper surface of the deck 18 are attached to the motorcycle 12 and provide an easy means of retrieving the motorcycle in the event the same falls overboard.

The motorcycle 12 has a conventional internal combustion engine 75 operatively connected to the rear wheel 56 by a suitable transmission 79 and is adapted to drive the rear wheel 56 forwardly or reversely in the conventional manner. As the motorcycle wheel 56 is rotated, the same will rotate the driven roller 50 which, in turn, will rotate the propeller blades 58 and 60. By using the speed and direction controls of the motorcycle 12 in the conventional manner, the speed and direction of rotation of the propellers 58 and 60 may be controlled, and thus the speed and forward and aft movement of the water vessel 10 may be easily controlled by the operator of the motorcycle 12.

The motorcycle 12 has a steering mechanism 80 which rotates the forward wheel 82 of the motorcycle 12 about a vertical axis to control the direction of the motorcycle 12, all of which is conventional in its construction, thus not requiring a detailed description. The forward wheel 82 of the motorcycle 12 is supported by an elongated U-shaped channel member 84 having an upturned forward end 85. The hollowed interior 86 (FIG. 3) of the member 84 is so sized as to snugly receive and support the forward motorcycle wheel 82 as well as to provide a steering coupling mechanism for controlling the direction of movement of the water vessel 10. The channel member 84 is carried by and rotatable with a rectangular bearing plate 88 disposed on the upper surface of the deck 18 which in turn supports a vertically disposed connecting shaft 89 (FIG. 2) extending through the deck 18 for connection therebelow to the midsection of a tie rod 90. It can thus be seen that as the steering mechanism 80 of the motorcycle 12 is rotated to rotate the forward wheel 82 thereof, the channel member 84 and thus the tie rod 90 will be rotated about the vertical axis of the connecting shaft 89.

A pair of transversely spaced rudders 91 and 93 are disposed for rotational movement about the vertical axes of their respective shafts 92 and 94 so as to control the direction of movement of the water vessel 10 in the conventional manner. Each shaft 92 and 94 is rotatably carried by the deck 18 and each shaft is fixedly attached to one end of an L-shaped connecting member 96, the opposite ends of which are pivotably attached to the ends of connecting rods 98 which, in turn, are pivotably attached at their opposite ends to the outer ends of the tie rod 90. Thus, it can be seen that when the tie rod 90 is rotated by the motorcycle steering mechanism 80 the pivotal connection of the connecting rods 98 between the tie rod 90 and the rudders 91 and 93 causes the same to be rotated in a direction corresponding to the direction of forward motorcycle wheel 82. When, for example, as viewed in FIG. 2, the forward wheel 82 of the motorcycle 12 is rotated toward the port side of the water vessel 10 so as to steer the water vessel 10 in that direction, the tie rod 90 will be rotated in a counterclockwise direction to move the starboard connecting rod forwardly, while moving the port connecting rod rearwardly. This results in the rudders 91 and 93 being inclined with respect to the fore-aft axis of the water vessel 10 to change the direction of the water vessel to the port side in the conventional manner. When the steering mechanism 80 of the motorcycle 10 is rotated toward the starboard side of the vessel, the rudders 91 and 93 are inclined with respect to the fore-aft axis of the vessel in an opposite manner so as to change the direction of the water vessel 10 toward the starboard side thereof in a conventional manner.

As can best be seen in FIGS. 2, 3 and 4, the pontoons 14 and 16 support a towing assembly 100 having a pair of towing wheels 102 adapted to swing from a lowered or down position, wherein the towing wheels 102 extend below the bottom of the pontoons to enable the towing of the water vessel 10 by the motorcycle 12 when it is desired to transport the vessel 10, to a raised or up position wherein the towing wheels 102 are raised above the deck 18 to a position above the water level when the water vessel 10 is in the water so as not to impede the motion of the water vessel 10 when the same is underway.

The towing assembly 100 comprises a U-shaped shaft 104 extending below the deck 18 and beyond the opposite outer sides of the pontoons 14 and 16. Shaft 104 is supported for rotational movement about an axis transverse to the fore-aft axis of the water vessel 10 by a plurality of spaced bearing members 106, which are coupled to the underside of the deck 18 by any suitable means such as fastening members 108 (FIG. 2). The U-shaped shaft 104 terminates at each of its opposite ends in a spindle 110 on which are rotatably mounted the towing wheels 102. Although the mounting of the towing wheels 102 is not shown in detail, it is to be understood that any suitable means may be employed to mount the towing wheels 102 to their respective spindles 110. Each of the pontoons 14 and 16 carries a right angle bracket 112 having an upper inclined face 114 and a lower vertical face 116. Although the brackets 112 may be attached to the pontoon by any suitable means, they are shown as welded to a right angle portion of a metal strap 118 extending around the peripheral surface of each pontoon 14 and 16.

When it is desired to convert the water vessel into a trailer to permit the transport of the same on land, the towing wheels 102 are lowered while the vessel is in the water until the legs 120 of the shaft 104 abut the vertical face 116 of the brackets 112. Each leg 120 has a sleeve member 122 with a flange portion through which a screw 124 extends and engages a threaded bore (unnumbered) in the vertical face 116 of the bracket 112. When screws 124 are tightened down, the towing wheels 102 are secured in the lowered position and the vessel 10 is ready for towing. When it is desired to raise the towing wheels 102, the vessel is placed in the water and the screws 124 are removed from the vertical face 116 of bracket 114. The towing wheels 102 are rotated to the raised position as shown in FIG. 2, that is, the legs 120 are brought into abutment with the inclined face 114 on each of the brackets 112. The sleeve members are rotated 90° to align the screws 124 with a threaded bore (unnumbered) in each of the inclined faces. Screws 124 are then tightened down to secure the towing wheels 102 in the raised position and the water vessel 10 is ready for water operation.

As can best be seen in FIGS. 2 and 3, the water vessel 10 is provided with a towing bar 115 attached to the underside or bottom surface of the deck 18 and the forward end portion of the pontoons 14 and 16 by a cross bar 117 (FIG. 3). The front end 119 of the towing bar 115 is hemispherically shaped with the interior thereof defining a socket adapted to be engaged by a conventional ball-type towing bar 121 carried by the motorcycle 12 as shown in FIG. 1. The arrangement of having towing bar 115 connected to both the deck 18 and the forward portions of each of the pontoons 14 and 16 evenly distributes the towing forces thereinbetween and thus reduces both the fatigue and stresses imparted to the water vessel 10 as the same is being transported on land. In addition to the cross member 29, the cross bar 117 also provides additional structural support to the water vessel 10. As can best be seen in FIGS. 1 and 3, the water vessel 10 has a pair of storage containers 200 mounted on opposite sides of the deck 18 above each of the pontoons 14 and 16 which may be used to store equipment necessary for the proper and safe operation of the water vessel 10.

Referring now to FIGS. 5 and 6 wherein there is illustrated another example of the present invention in the form of a water vessel 130 having the towing assembly 100 to facilitate the transporting of the water vessel on land by any suitable land traversing vehicle, such as a motorcycle 12. The water vessel 130 is of a construction similar to the water vessel 10 and has many common components identified by the same numerals used hereinbefore in the description of the water vessel 10. The water vessel 130, which is particularly adapted to be driven by a snowmobile 131, comprises the starboard and port pontoons 14 and 16 (only the starboard pontoon 14 is illustrated in FIG. 5) connected to one another by the deck 18 in such a manner that the pontoons 14 and 16 are maintained in a spaced, parallel relationship. The deck 18 is fastened to the pontoons 14 and 16 by the circular metal straps 20 which are positioned at strategic locations along a longitudinal length of each pontoon 14 and 16 and which straps 20 are fastened to the underside of the deck 18 by the bolt and nut assemblies 24 in the same manner as hereinbefore described with respect to the embodiment disclosed in FIGS. 1–4. Cross members 29 also provide additional structural support.

The central portion of the deck 18 has an elongated aperture 136 opening into a well 138. The well 138 is of a construction similar to the construction of the aforementioned well 28 in that it has parallel sidewalls (not shown) connected by forward, aft and bottom walls 144, 146 and 147, respectively. The parallel sidewalls of the well 138 each support bearing members (not shown) within which are rotatably mounted a driven shaft 152 and an idler shaft 154. The shafts are so mounted that their longitudinal axes are parallel to one another but transversely disposed with respect to the fore-aft axis of the water vessel 130. The well 138, which is preferably of an integral construction, may be secured to the underside of the deck 18 by any suitable means; however, it is preferred that the well 138 be fastened in the same manner as the well 28 to the underside of the deck 18 as hereinbefore described. The driven shaft 152 and idler shaft 154 respectively support driven roller 160 and idler roller 162. The outer peripheral surface of each roller has a grooved surface 163 forming a sprocket adapted to cooperate with mating teeth 164 formed on the inside surface of an endless drive belt 166, such that when the belt 166 is driven by the snowmobile 131, the rollers 160 and 162 are rotated about the longitudinal axis of their respective shafts. The idler roller 162 functions only to support the endless drive belt 166, while the driven roller 160 in addition to supporting the endless drive belt 166 functions as a transmission coupling between the drive belt 166 and the propellers 58 and 60 (FIG. 3). The driven shaft 152 has a pair of beveled gears 172 disposed on opposite sides of the driven roller 160 which mesh with the beveled gears 66 and 68 (FIG. 3) carried at the ends of the aforementioned drive shafts 67 and 69 on which the propellers 58 and 60 are mounted. The shafts 67 and 69 extend through the sealed bearing support 70 in the rear wall 146 of the well 138. The outer surface of the drive belt 166 has a rough finish so as to prevent any slippage between it and the drive track 168 of the snowmobile 131 positioned thereon, such that when the snowmobile 131 is driven in the conventional manner the driving engagement between the drive belt 168 of the snowmobile 131 and the drive belt 166 of the water vessel 130 will cause the driven roller 160 to rotate the propellers 58 and 60 to thereby propel the water vessel 130 forwardly or rearwardly depending upon the direction of rotation of the snowmobile drive belt 168.

The forward end of the snowmobile 131 is supported by a pair of parallel skis 174 which form a portion of the steering mechanism 176 of the snowmobile 131. The skis 174, which are adapted to control the direction of the water vessel 130 when the same is underway, are fixedly attached to a support plate 178 by means of releasably attached clamps 180. The support plate 178, which is rotatably mounted on deck 18, carries a shaft 182 which extends through an aperture in deck 18 for attachment to the tie rod 90. The tie rod 90, in turn, is connected to the rearwardly mounted rudders 91 and 93 by connecting rods 98 and arms 96 as hereinbefore described. Thus as the snowmobile skis 174 are rotated in the conventional manner, the support plate 178 and the tie rod 90 are also rotated and thereby cause the rudders 91 and 93 to turn in the appropriate direction corresponding to the desired direction of travel.

Since the snowmobile 131 is self-supporting, that is, it will remain in an upright position, the snowmobile 131 does not require the support arms 72 as in the case of the motorcycle 12; however, the safety chains 73 are still employed. The clamps 180 utilized to clamp the skis 174 to the support plate 178 should be of sufficient strength to restrain the snowmobile from either forward or rearward movement when in operation, as well as being capable of transmitting the rotational movement of the skis 174 to the support plate 178. Although not shown, the water vessel 130 may have storage containers mounted on the deck 18 such as the storage containers 200 hereinbefore described.

It can thus be seen that the present invention provides a water vessel adapted to be propelled and controlled by a snowmobile, which adaptation provides the owner of the snowmobile with a year-round use for his snowmobile.

It can also be seen that the present invention has provided a water vessel adapted to be propelled and controlled in the water by a land traversing vehicle, which land traversing vehicle in one embodiment is adapted to tow the water vessel.

It can also be seen that the present invention provides a simple means for converting a water vessel into a trailer so that the same may be transported on land in a safe and convenient manner.

Although only two forms of the present invention have been illustrated, it should be apparent to those skilled in the art of water vessels that other forms and modifications can be made to the present invention without departing from the spirit of the invention or the scope of the appended claims.

What is claimed is as follows:

1. A water vessel adapted to be propelled by a snowmobile, said water vessel comprising:
    a snowmobile having a frame supported by a pair of transversely spaced skis and a rotatably mounted endless drive belt, said drive belt being driven by power generating means of said snowmobile, said skis being operable for rotational movement about a vertical axis to steer said snowmobile;
    a pair of pontoons of a length exceeding the length of said snowmobile;
    a deck extending the full length of said pontoons, said deck having a forward end and a rear end;
    means connecting said deck to said pontoons to maintain said pontoons in a spaced, parallel relationship;
    a propeller rotatably carried by said vessel at the rear end of said deck;
    a rudder carried at the rear end of said deck of said vessel for steering the same;
    means for mounting said snowmobile on said deck, said mounting means comprising a pair of spaced, parallel rollers rotatably carried by said deck along axes transversely disposed to the fore-aft axis of said vessel; said pair of rollers supporting and being rotatable by a second endless drive belt, said first mentioned drive belt being supported by said second belt and adapted to rotate said second belt as said snowmobile is driven; and linkage means operatively connecting one of said rollers to said propeller to rotate same;
    said mounting means further comprising a plate mounted on the forward end of said deck for rotational movement about a vertical axis with respect to both said deck and said pontoons, said skis of said snowmobile being received on said plate and releasably held thereon; and means connecting said rotating plate to said rudder whereby said rudder is rotated in response to the rotational movement of the plate as said snowmobile skis are rotated;
    means connecting said snowmobile skis to said plate for preventing both lateral and forward movement of said snowmobile with respect to said deck;
    the endless drive belt of the snowmobile being of a greater length than the second endless drive belt rotating the pair of rollers causing the endless drive belt to overhang the rollers for an even distribution of weight;
    the endless drive belt of the snowmobile and the second drive belt rotating the rollers being arranged tautly between their respective carrying wheels and rollers; and
    a shaft adapted for rotational movement about an axis transversely disposed with respect to the fore-aft axis of said water vessel, the outer end of said shaft being of an L-shaped configuration and extending beyond the outer contour of said pontoons, said support wheels being mounted on the end of the legs of said L-shaped shaft, said shaft being rotatable in such a manner as to position said support wheels in said lowered and raised positions, and means for selectively locking said support wheels in the raised and lowered positions.

* * * * *